United States Patent [19]
Herden et al.

[11] Patent Number: 5,659,110
[45] Date of Patent: Aug. 19, 1997

[54] PROCESS OF PURIFYING COMBUSTION EXHAUST GASES

[75] Inventors: Hansjoerg Herden, Rodgau; Gernot Mayer-Schwinning, Bad Homburg; Guenter Boening, Frankfurt am Main, all of Germany

[73] Assignee: Metallgesellschar Aktiengesellschaft, Franffurt am Main, Germany

[21] Appl. No.: 375,634

[22] Filed: Jan. 20, 1995

[30] Foreign Application Priority Data

Feb. 3, 1994 [DE] Germany ............... 44 03 244.7

[51] Int. Cl.$^6$ ............. A63D 3/00; C01B 21/00; B01D 55/02
[52] U.S. Cl. ............. 588/207; 95/134; 95/142; 95/902; 423/210; 423/240 S; 423/245.1
[58] Field of Search ............. 423/210, 240 S, 423/245.1; 95/134, 142, 902; 588/207

[56] References Cited

U.S. PATENT DOCUMENTS

| | | | |
|---|---|---|---|
| 4,101,631 | 7/1978 | Ambrosini et al. | 423/210 |
| 4,274,842 | 6/1981 | Lindau | 95/134 |
| 4,935,580 | 6/1990 | Chao et al. | 585/820 |
| 5,164,076 | 11/1992 | Zarchy et al. | 208/245 |
| 5,380,507 | 1/1995 | Hirturer et al. | 423/240 S |

FOREIGN PATENT DOCUMENTS

| | | | |
|---|---|---|---|
| 3919124 | 1/1990 | Germany. | |
| 4012982 | 10/1991 | Germany. | |
| 4034498 | 3/1992 | Germany. | |
| 4128106 | 2/1993 | Germany. | |
| 1747130 | 7/1992 | U.S.S.R. | 95/134 |

OTHER PUBLICATIONS

In Re Edwards, 1956 CD 264, 109 6SPQ 380 CCPA.

*Primary Examiner*—Gary P. Straub
*Attorney, Agent, or Firm*—Michael J. Striker

[57] ABSTRACT

The process of purifying oxygen-containing exhaust gases produced by combustion of waste materials including garbage, industrial waste and sewage sludge includes reacting an exhaust gas containing pollutants in a gas-solids suspension at a temperature of 120° to 140° C. and at a gas velocity from 3 to 20 m/s for a reaction time of 0.5 to 10 seconds with a mixture containing naturally occurring zeolites to remove mercury, mercury compounds and polyhalogenated hydrocarbons pollutants from the exhaust gas. The naturally occurring zeolites have a median particle size ($d_{50}$) from 5 to 50 micrometers and the gas-solids suspension has a mean suspension density from 0.020 to 10 kg of solids per sm$^3$ of exhaust gas. The mixture contains from 10 to 20% by weight mordenite, from 60 to 70% by weight clinoptilolite, from 0 to 5% by weight montmorillonite and a remaining balance of SiO$_2$. The purified gas contains <50 micrograms of mercury per sm$^3$, <0.1 ng TE per sm$^3$ of polyhalogenated dibenzodioxins and dibenzofurans and of <1 microgram of PCB, PCP and PCA per sm$^3$.

9 Claims, 1 Drawing Sheet

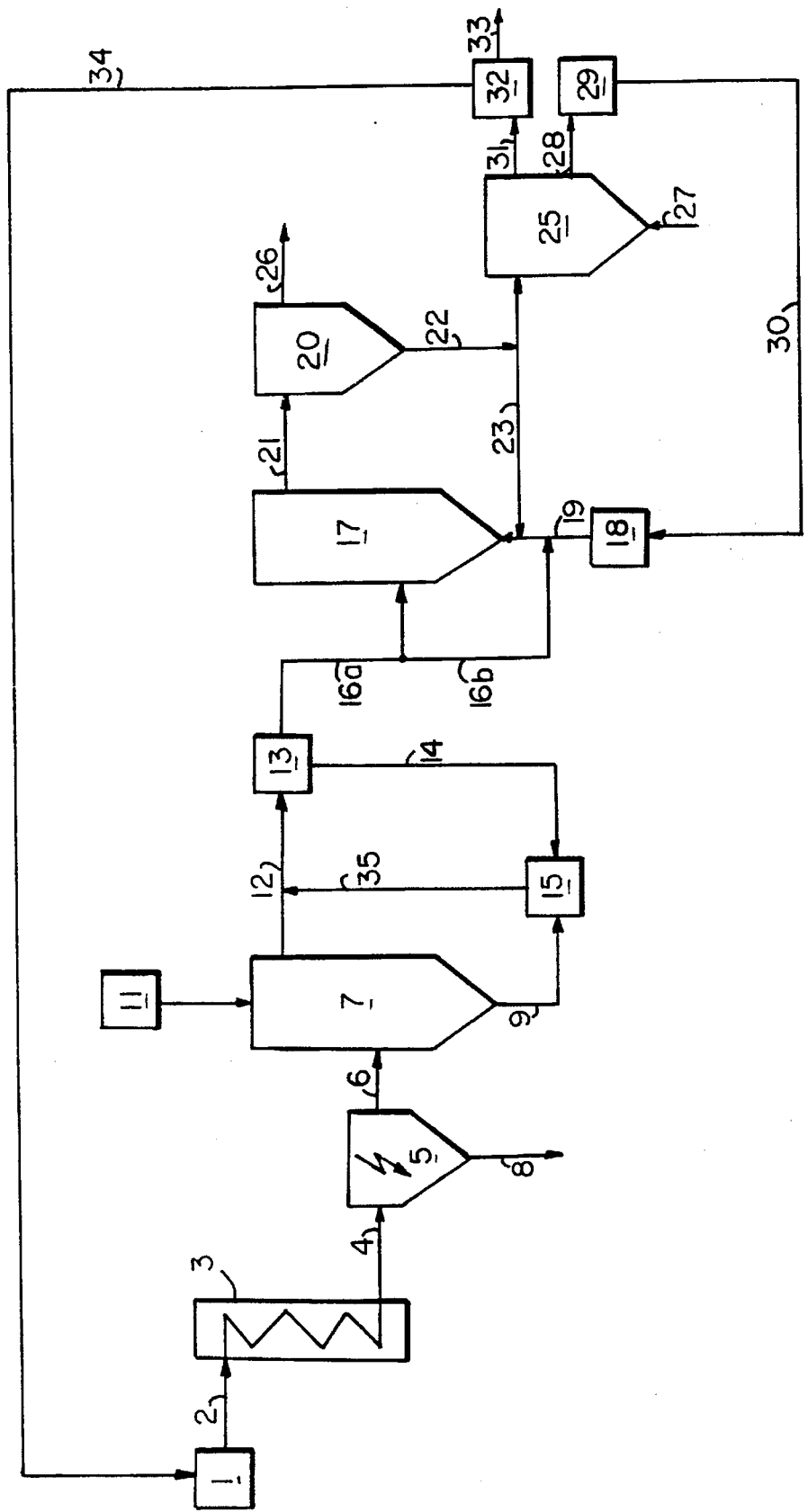

PROCESS OF PURIFYING COMBUSTION EXHAUST GASES

BACKGROUND OF THE INVENTION

The present invention relates to a process of purifying oxygen-containing exhaust gases produced by the combustion of garbage, industrial waste materials and sewage sludge, wherein mercury, mercury compounds and polyhalogenated hydrocarbons are removed from the exhaust gases by adsorption on zeolites.

Because garbage, industrial waste materials, and sewage sludge have different and changing compositions, the exhaust gases produced by combustion of these waste materials are also contaminated with polluting substances in varying amounts. All impurities must be substantially completely removed from the combustion exhaust gases before it is permissible to discharge the exhaust gases into the atmosphere, since a very large number of impurities will, even in a low concentration, have toxic effects on human beings, animals and plants. The impurities contained in the exhaust gases produced by the combustion of waste materials include particularly dust, $SO_2$, HCl, HF, Hg, mercury compounds, compounds of heavy metals, polyhalogenated dibenzodioxins and dibenzofurans, polychlorinated biphenyls (PCB), polychlorinated phenols (PCP) and polychlorinated aromatic compounds (PCA). Because the waste materials are burned with a hyperstoichiometric amount of oxygen, the combustion exhaust gases contain 2 to 12% by volume $O_2$ per $sm^3$ ($sm^3$—standard cubic meter).

The dust, which is contained in the exhaust gases in an amount of up to 50,000 $mg/sm^3$, is separated in cyclones, electrostatic precipitators, cloth filters or scrubbers. The exhaust gas which is to be dedusted may optionally be conducted through more than one of such unit. The known dedusting processes, even when carried out on a commercial scale, permit residual gas contents below 5 $mg/sm^3$. Dedusting must be effected to the highest possible degree because the dust mainly adsorbs toxic heavy metals, compounds of heavy metals and polyhalogenated dibenzodioxins and dibenzofurans.

$SO_2$ and HCl are each contained in the exhaust gases in an amount of up to 3000 $mg/sm^3$ and HF is contained therein in amounts of up to 100 $mg/sm^3$. Together with the water vapor contained in the atmosphere the gaseous compounds form acids, which are very often present as aerosols, and the gaseous compounds have a toxic activity. For this reason they are substantially completely removed. The known purifying processes may be carried out on a commercial scale to effect a purification to residual contents of <20 $mg/sm^3$ $SO_2$, <5 $mg/sm^3$ HCl, and <1 $mg/sm^3$ HF. $SO_2$, HCl and HF are removed by dry or quasi-dry or wet purifying processes and it is possible to carry out a plurality of such processes in succession. The reactants used in these processes mainly include $Ca(OH)_2$, CaO, $CaO_3$, NaOH, and/or $Na_2CO_3$. A particularly high importance has been achieved by spray absorption, in which an aqueous suspension of $Ca(OH)_2$ reacts with the acid pollutants $SO_2$, HCl, and HF, the water is evaporated, and a solid reaction product is obtained, which contains also dust and other pollutants. Scrubbing processes are also known, by which the pollutants $SO_2$, HCl and HF can be removed to a very high degree.

The heavy metals, the compounds of heavy metals, particularly mercury and mercury compounds, and the polyhalogenated hydrocarbons are contained in the combustion exhaust gases in a lower concentration. But these substances have an extremely high toxic activity and for this reason must be almost completely removed from the exhaust gases. In the prior art this is preferably effected by adsorption processes and/or scrubbing processes. Adsorbents which have been found to be suitable include particularly activated carbon and zeolites. Scrubbing processes are carried out under acid or alkaline conditions.

The commercial use of the known processes of purifying exhaust gases particularly depends on whether they require only a low capital expenditure and low operating costs and results in process products which become available only at a very low rate and can be dumped without difficulty or can be recycled to the purifying processes after a regeneration. To separate the above-mentioned impurities to the highest possible degree, it is usual to combine a plurality of purifying processes. It is an object of the present invention to use zeolites as an adsorbent so that the use of activated carbon as an adsorbent and the resulting risks regarding the safety of the adsorption plants in operation can be avoided. Another object of the present invention is to provide an adsorption process which can conveniently be combined with the known processes for dedusting and for separating acid pollutants.

Published German Application 40 12 982 discloses a process of purifying gases and exhaust gases so as to remove inorganic and organic pollutants in which finely powdered zeolites and/or similar inorganic substances are blown into the gas stream, the gas and solids are thoroughly mixed, the solids are applied to a surface filter and are left on the filter so as to form a renewable loose adsorbent layer having a sufficient depth, and the pollutant-laden solids are mechanically removed from there. In the known process it is also contemplated that the inorganic substances having active surfaces are used as fine powders having a particle size distribution of 100% <100 micrometers, preferably 100% <50 micrometers. It is also contemplated in the known process that the inorganic substances having active surfaces are used as a finely powdered material having a particle size distribution of 100% <100 micrometers, preferably 100% <50 micrometers. It is also contemplated in the known process that the substances having active surfaces are contacted with sulfur, sulfides or sulfur-releasing substances to bind volatile heavy metals and/or contacted with heavy metals or compounds of heavy metals, such as vanadium, tungsten, molybdenum, manganese, iron, nickel, cobalt, chromium, copper, tin, zinc and/or titanium, in order to accelerate oxidation or reduction reactions. It has also been proposed in Published German Application 40 12 982 to use the known process for removal of mercury, cadmium, arsenic, antimony, thallium and/or of PCB'S, chlorinated hydrocarbons, dioxins/furans and/or polynuclear aromatic hydrocarbons.

Published German Application 39 19 124 discloses for the removal of noxious polycyclic hydrocarbons (such as dioxins and furans) and heavy metals from exhaust gases coming from waste incinerators a process in which the exhaust gases, after they have been prepurified to remove dust, HCl, HF, $SO_x$, $NO_x$ and heavy metals are subjected to an adsorption/filtration at temperatures in the range from 70° to 160° C. to remove the remaining polycyclic hydrocarbons and heavy metals. In that process it is contemplated that the prepurified exhaust gases are first mixed in a reactor with finely divided adsorbents and are subsequently fed to a filtering separator, in which an adsorbent cake is formed on the filter cloth and is flown through by the exhaust gases. Polycyclic hydrocarbons and heavy metals are substantially completely removed in that known process, in which, e.g., activated carbon, molecular sieves, sodium sulfide, and hydrate of lime are used as adsorbents.

Finally, Published German Application 41 28 106 discloses a process for selective removal of highly condensed polycyclic hydrocarbons, particularly of halogenated dibenzodioxins and dibenzofurans, from prededusted exhaust gases which contain $SO_2$, $H_2O$ and heavy metals, in which the hydrocarbons are adsorbed on a solid adsorbent consisting of a de-aluminated zeolite having a $SiO_2/Al_2O_3$ ratio of 20:1 to 1000 to 1. The adsorption is effected at a temperature of from 20° to 200° C. The zeolite has a particle diameter of 1 to 5 mm and is disposed in a reactor in a fixed bed or moving bed.

It has been found that the known purifying processes must be improved because more stringent requirements regarding the purifying efficiency must be complied with.

SUMMARY OF THE INVENTION

For the foregoing reason, it is an object of the present invention to provide an economical process for purification of the exhaust gases produced by the combustion of garbage, industrial waste materials and sewage sludge which, even in case of fluctuations of the concentrations of several pollutants, reliably ensures that the pollutant concentrations in the pure gas remain below low limits. Specifically the process is required to ensure that the pure gas contains <50 micrograms Hg per $sm^3$, polyhalogenated dibenzodioxins and dibenzofurans in a concentration of <0.1 ng TE per $sm^3$, and a total concentration of <1 microgram PCB, PCP, and PCA per $sm^3$. (TE=toxicity equivalent in accordance with the NATO Standard).

The object underlying the invention is accomplished by a process comprising reacting exhaust gases in a gas-solids suspension at a temperature above the dew point temperature and in a range from 80° to 180° C. and at a gas velocity from 3 to 20 m/s with a mixture including naturally occurring zeolites for a reaction time of 0.5 to 10 seconds. The median particle size, $d_{50}$, of the mixed zeolites is 5 to 50 micrometers and the mean suspension density of the gas-solids suspension is 0.02 to 10 kg solids per $sm^3$ exhaust gas. By the process in accordance with the invention it can be ensured that the pure gas contains <50 micrograms Hg per $sm^3$, polyhalogenated dibenzodioxins and dibenzofurans in a concentration of <0.1 ng TE per $sm^3$ and a total concentration of <1 microgram PCB, PCP and PCA per $sm^3$.

The process in accordance with the invention has a particularly high adsorption efficiency if the exhaust gas is reacted at a temperature of 120° to 140° C. with the mixture of naturally occurring zeolites and if the mixture of the naturally occurring zeolites contain 10 to 20% by weight mordenite, 60 to 70% by weight clinoptilolite, 0 to 5% by weight montmorillonite, balance $SiO_2$. Under these process conditions the pollutant concentrations in the pure gas is reliably maintained at and, as a rule, below the above-mentioned limits.

The adsorption efficiency of the process in accordance with the invention is further improved if the mixture of the naturally occurring zeolites is doped with 0.1 to 1% by weight $MnSO_4$, $FeSO_4$, $CoSO_4$, $NiSO_4$ and/or $CuSO_4$. The application of the metal salts particularly improves the removal of mercury.

Any small amounts of acid pollutants—i.e., $SO_2$, HCl and HF—contained in the exhaust gas are removed in accordance with the invention when the mixture which contains the naturally occurring zeolites also contains 10 to 30% by weight $CaCO_3$, CaO, and/or $Ca(OH)_2$. $CaCO_3$, CaO, and $Ca(OH)_2$ may alternatively be used in the form of contaminated mixtures of that type that become available in a spray absorber.

The process in accordance with the invention may be carried out in such a way that the reaction is effected in a circulating fluidized bed, in which the gas velocity is 3 to 8 meters per second, preferably 4 to 5 meters per second, and the average suspension density of the gas-solids suspension is 2 to 10 kg solids per $sm^3$ exhaust gas. That processing permits a reliable purification of the exhaust gases produced by the combustion of waste materials even if the waste materials are combusted at different rates in the combustion plant.

The circulating fluidized bed system consists of a circulating system, which consists of a reactor, a solids separator and a solids recycle line. Contrary to an "orthodox" fluidized bed, in which a dense phase is separated by a distinct density step from the overlying gas space, a circulating fluidized bed is characterized by states of distribution without a defined boundary layer. In a circulating fluidized bed there is no density step between a dense phase and an overlying gas space but the solids concentration in the reactor decreases continuously from bottom to top. It is known to define the operating conditions of a circulating fluidized bed by the Froude and Archimedes numbers.

In accordance with a preferred embodiment of the invention a portion of the mixture including the zeolites laden with pollutants is treated at 300° to 600° C. in a fluidizing bed with air as a fluidizing gas and the air leaving the fluidized bed is cooled to room temperature to separate the mercury present. Because of that the zeolites can be regenerated and recycled to the process cycle at least in part and mercury can be recovered as a valuable substance. This embodiment of the process is used especially if the mixture including the mixed zeolites contains $CaCO_3$, CaO and/or $Ca(OH)_2$ and as a result, their reaction products.

Alternatively in accordance with another embodiment of the invention a portion of the mixture including the zeolites laden with the pollutants are treated at 800° to 1300° C. with air as a fluidizing gas and the air leaving the fluidized bed is cooled to room temperature to separate the mercury. In this embodiment of the process the mercury is removed from the mixture and the adsorbed hydrocarbons are entirely destroyed. But in that regenerating method it must be ensured that the adsorptive activity of the mixed zeolites is not destroyed by regeneration at excessively high temperatures.

BRIEF DESCRIPTION OF THE DRAWING

The objects, features and advantages of the present invention will now be illustrated in more detail by the following detailed description, reference being made to the accompanying drawing in which the sole FIGURE is a flow chart illustrating a process according to the invention in which the adsorption process is performed in a circulating fluidized bed.

DESCRIPTION OF THE PREFERRED EMBODIMENTS

Household garbage, sewage sludge and industrial waste materials are incinerated in a waste material incinerating plant 1. The combustion exhaust gas leaving the incinerating plant 1 contains dust and gaseous pollutants and is at a temperature of 800° to 1000° C. The exhaust gas flows through line 2 into the heat exchanger 3, which is used to recover energy and in which the exhaust gas is cooled to a temperature from 200° to 300° C. The cooled exhaust gas is fed in line 4 to the electrostatic precipitator 5, in which the exhaust gas is substantially completely dedusted at a temperature from 200° to 300° C. The dust-like fly ash which has been separated in the electrostatic precipitator 5 is carried off through the line 8. The partly dedusted exhaust gas is fed through line 6 to the spray absorber 7.

From the supply bin 11 the spray absorber 7 is fed through line 10 with a suspension which consists of water and $Ca(OH)_2$. In that spray absorber 7 the water is evaporated so that the exhaust gas is cooled to a temperature of about 130° C. Particularly the acid gaseous pollutants $SO_2$, HCl and HF react with the $Ca(OH)_2$ at the same time to form the corresponding calcium salts. These salts, the unreacted $Ca(OH)_2$ and the remaining dust-like fly ash are withdrawn from the spray absorber 7 over line 9. The exhaust gases leaving the spray absorber 7 through line 12 still contain dust-like solids, which consist of unreacted $Ca(OH)_2$, of calcium salts of the gaseous acid pollutants and of dust-like fly ash. The solids are removed from the exhaust gas by the cloth filter 13 and are passed through line 14 to the supply bin 15, in which they are combined with the solids which are discharged through line 9 from the spray absorber 7. The materials collected in the supply bin 15 are of the same kind. To permit a filter cake to be built up quickly on the cloth filter 13, part of the solids contained in the supply bin 15 are fed through line 35 into the line 12. The cooling and dedusting of the combustion exhaust gas, the removal of the gaseous acid pollutants from the combustion exhaust gases in a spray absorber, and the subsequent dedusting of the combustion exhaust gases in a cloth filter are known in the art.

A substantially completely purified exhaust gas which is at a temperature of about 130° C. leaves the cloth filter 13 and is supplied to the fluidized bed reactor 17 as a secondary gas through line 16a and as a primary gas through the line 16b. Mixed natural zeolites consisting of 20% by weight mordenite, 70% by weight clinoptilolite, 5% by weight montmorillonite, with a remaining balance of $SiO_2$ are fed from the supply bin 18 through line 19 to the primary gas conducted in line 16b. The mixed zeolites have a median particle size $d_{50}$ of about 25 micrometers. In the fluidized bed reactor 17 a gas-solids suspension is formed, which is in the state of a circulating fluidized bed. In the fluidized bed reactor 17 the mean suspension density between the inlet for the secondary gas and the gas outlet connected to the cyclone 20 is about 3 $kg/m^3$. The fluidized bed reactor 17 contains a large amount of the mixed zeolites, only a small part of which is entrained by the gas stream through line 21 to the cyclone 20. The gas-solids suspension is separated in the cyclone 20. The solid particles are withdrawn from the cyclone 20 in line 22. Part of the solids are recycled to the fluidized bed reactor 17 through lines 23 and 16b. Another part of the solids is passed through line 24 to the fluidized bed reactor 25. The purified exhaust gas leaves the cyclone 20 through the line 26 and at a temperature of about 120° C. is discharged through a chimney into the atmosphere. Residual dust may be removed in a filter, which follows the cyclone 20 and is not shown in the drawing.

In the reactor 25 the pollutant-laden mixed zeolites are regenerated at a temperature from 800° to 900° C. Air is used as a fluidizing gas and is supplied to the reactor 25 through line 27. Part of the solids is withdrawn from the reactor 25 through line 28 and, after having been cooled in the solids cooler 29, is supplied with air as a cooling fluid. That air is supplied to the reactor 25 through line 27. That cooling circuit is not shown in the drawing. The hot fluidizing gas is supplied from the reactor 25 through line 31 to the condenser 32, in which liquid mercury condenses. The liquid mercury leaves the condenser 32 through line 33. The air leaving the condenser 32 is recycled through line 34 to the waste material incinerating plant 1. In the reactor 25 the adsorbed organic pollutants are decomposed by oxidation to a high degree.

The exhaust gas which was supplied through lines 16a and 16b to the fluidized bed reactor 17 had a mercury content of 2 $mg/sm^3$, a content Of polyhalogenated dibenzodioxins and dibenzofurans of 20 $ng/sm^3$, and a total content of PCB, PCP and PCA of 10 micrograms per $sm^3$. The resulting pure gas conducted through line 26 had a mercury content of <50 micrograms per $sm^3$, a content of polyhalogenated dibenzodioxins and dibenzofurans of <0.1 ng TE per $sm^3$ and a total content of PCB, PCP and PCA of <1 microgram per $sm^3$.

Through lines 16a and 16b the fluidized bed reactor 17 was supplied with exhaust gases at a total rate of 600 $sm^3/h$. The fluidized bed reactor 17 always contained 60 kg of the mixed zeolites. In the cyclone 20, 1 kg mixed zeolites were collected per hour. Of the collected mixed zeolites, 0.9 kg was recycled to the fluidized bed reactor 17 and 0.1 kg was supplied to the reactor 25 for regeneration.

For this reason about 166 mg zeolite was consumed per $sm^3$ exhaust gas.

It may be necessary to provide the cyclone 20 in the form of a plurality of cyclone stages or to provide a filter element, which follows the cyclone 20. As a result, the residual dust content of the pure gas conducted in line 26 may be decreased below 5 $mg/sm^3$. The mixed zeolites conducted in line 24 are laden with about 2% by weight pollutants.

To dope the zeolites with heavy metal salts, a metal salt solution is sprayed onto the hot zeolites so that the water of the solution is evaporated and a dry product, which is impregnated with metal salts, is obtained. By that impregnation the sorption capacity for mercury may be increased from a maximum of 2% by weight to a maximum of 3% by weight.

While the invention has been illustrated and described as embodied in a process for purifying combustion exhaust gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A process of purifying oxygen-containing exhaust gases produced by combustion of waste materials including garbage, industrial waste and sewage sludge, said process comprising the steps of:

a) reacting an exhaust gas in a gas-solids suspension at a temperature from 120° to 140° C. and at a gas velocity from 3 to 20 m/s for a reaction time of 0.5 to 10 seconds with a mixture containing naturally occurring zeolites to remove mercury, mercury compounds and polyhalogenated hydrocarbons, wherein said mixture comprises from 10 to 20% by weight mordenite, from 60 to 70% by weight clinoptilolite, from 0 to 5% by weight montmorillonite and a remaining balance of $SiO_2$, said naturally occurring zeolites have a median particle size ($d_{50}$) from 5 to 50 micrometers and the gas-solid suspension has a mean suspension density from 0.020 to 10 kg of said solids per $sm^3$ of said exhaust gas; and b) forming a pure gas from said exhaust gases, said pure gas containing <50 micrograms of said mercury per $sm^3$ of said exhaust gases, polyhalogenated dibenzodioxins and dibenzofurans in a concentration of <0.1 ng TE per $sm^3$ of said exhaust gases and a total concentration of <1 microgram PCB, PCP and PCA per $sm^3$ of said exhaust gases.

2. The process according to claim 1, wherein said reacting occurs in a circulating fluidized bed, said gas velocity is from 3 to 8 meters per second and said mean suspension density is from 2 to 10 kg of said solids per $sm^3$ of said exhaust gas.

3. The process according to claim 2, wherein said gas velocity is from 4 to 5 meters per second.

4. The process according to claim 1, wherein said reacting occurs in a reactor in a solids-entraining gas stream, said gas velocity is from 6 to 20 meters per second and said mean suspension density is from 20 to 200 g solids per $sm^3$.

5. The process according to claim 1, further comprising forming a portion of said mixture laden with pollutants during the reacting, treating said portion laden with said pollutants with air as a fluidizing gas at 300° to 600° C. in a fluidized bed and, after the treating, cooling the air leaving the fluidized bed to room temperature to separate the mercury.

6. The process according to claim 1, further comprising forming a portion of said mixture laden with pollutants during the reacting, treating said portion laden with said pollutants with air as a fluidizing gas at 800° to 1300° C. and, after the treating, cooling the air to room temperature to separate the mercury.

7. A process of purifying oxygen-containing exhaust gases produced by combustion of waste materials including garbage, industrial waste and sewage sludge, said process comprising the steps of:

a) reacting an exhaust gas in a gas-solids suspension at a temperature from 120° to 140° C. and at a gas velocity from 3 to 20 m/s for a reaction time of 0.5 to 10 seconds with a mixture containing naturally occurring zeolites to remove mercury, mercury compounds and polyhalogenated hydrocarbons, wherein said mixture consists of 0.1 to 1% by weight of at least one sulfate selected from the group consisting of $MnSO_4$, $FeSO_4$, $CoSO_4$, $NiSO_4$ and $CuSO_4$; from 10 to 20% by weight mordenite; from 60 to 70% by weight clinoptilolite; from 0 to 5% by weight montmorillonite and a remaining balance of $SiO_2$, said naturally occurring zeolites have a median particle size ($d_{50}$) from 5 to 50 micrometers and the gas-solid suspension has a mean suspension density from 0.020 to 10 kg of said solids per $sm^3$ of said exhaust gas; and b) forming a pure gas from said exhaust gases, said pure gas containing <50 micrograms of said mercury per $sm^3$ of said exhaust gases, polyhalogenated dibenzodioxins and dibenzofurans in a concentration of <0.1 ng TE per $sm^3$ of said exhaust gases and a total concentration of <1 microgram PCB, PCP and PCA per $sm^3$ of said exhaust gases.

8. A process of purifying oxygen-containing exhaust gases produced by combustion of waste materials including garbage, industrial waste and sewage sludge, said process comprising the steps of:

a) reacting an exhaust gas in a gas-solids suspension at a temperature from 120° to 140° C. and at a gas velocity from 3 to 20 m/s for a reaction time of 0.5 to 10 seconds with a mixture containing naturally occurring zeolites to remove mercury, mercury compounds and polyhalogenated hydrocarbons, wherein the mixture contains 10 to 30% by weight of at least one member selected from the group consisting of $CaCO_3$, CaO and $Ca(OH)_2$, from 10 to 20% by weight mordenite; from 60 to 70% by weight clinoptilolite; from 0 to 5% by weight montmorillonite and a remaining balance of $SiO_2$, said naturally occurring zeolites have a median particle size ($d_{50}$) from 5 to 50 micrometers and the gas-solid suspension has a mean suspension density from 0.020 to 10 kg of said solids per $sm^3$ of said exhaust gas;

b) forming a pure gas from said exhaust gases, said pure gas containing <50 micrograms of said mercury per $sm^3$ of said exhaust gases, polyhalogenated dibenzodioxins and dibenzofurans in a concentration of <0.1 ng TE per $sm^3$ of said exhaust gases and a total concentration of <1 microgram PCB, PCP and PCA per $sm^3$ of said exhaust gases.

9. A process of purifying oxygen-containing exhaust gases produced by combustion of waste materials including garbage, industrial waste and sewage sludge, said process comprising the steps of:

a) providing a mixture containing naturally occurring zeolites and consisting of 0.1 to 1% by weight of at least one sulfate selected from the group consisting of $MnSO_4$, $FeSO_4$, $CoSO_4$, $NiSO_4$ and $CuSO_4$; from 10 to 30% by weight of at least one member selected from the group consisting of $CaCO_3$, CaO and $Ca(OH)_2$; from 10 to 20% by weight mordenite; from 60 to 70% by weight clinoptilolite; from 0 to 5% by weight montmorillonite and a remaining balance of $SiO_2$;

b) reacting an exhaust gas in a gas-solids suspension at a temperature from 120° to 140° C. and at a gas velocity from 3 to 20 m/s for a reaction time of 0.5 to 10 seconds with said mixture to remove mercury, mercury compounds and polyhalogenated hydrocarbons, wherein said naturally occurring zeolites have a median particle size ($d_{50}$) from 5 to 50 micrometers and the gas-solid suspension has a mean suspension density from 0.020 to 10 kg of said solids per $sm^3$ of said exhaust gas;

c) treating a portion of said mixture laden with pollutants with air as a fluidizing gas at 300° to 600° in a fluidized bed to regenerate the naturally occurring zeolites in said portion and, after the treating, cooling the air leaving the fluidized bed to room temperature to separate the mercury;

d) forming a pure gas from said exhaust gases, said pure gas containing <50 micrograms of said mercury per $sm^3$ of said exhaust gases, polyhalogenated dibenzodioxins and dibenzofurans in a concentration of <0.1 ng TE per $sm^3$ of said exhaust gases and a total concentration of <1 microgram PCB, PCP and PCA per $sm^3$ of said exhaust gases.

* * * * *